Dec. 14, 1954  E. W. MILLER  2,696,762
GEAR FINISHING MACHINE
Filed June 17, 1950  11 Sheets-Sheet 1

Inventor
Edward W. Miller
by Wright, Brown,
Quinby & May Attys.

Dec. 14, 1954    E. W. MILLER    2,696,762
GEAR FINISHING MACHINE
Filed June 17, 1950    11 Sheets-Sheet 2
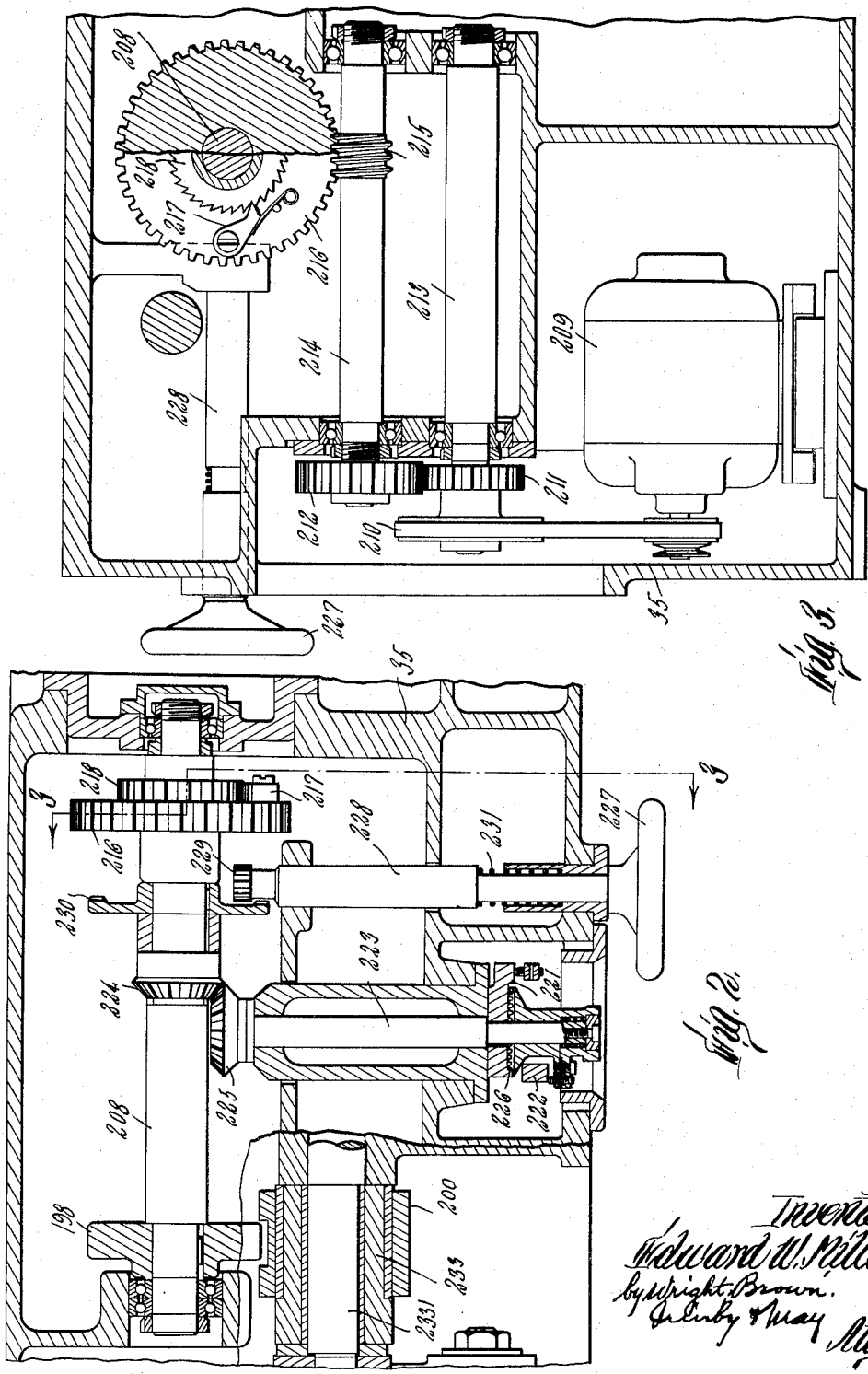

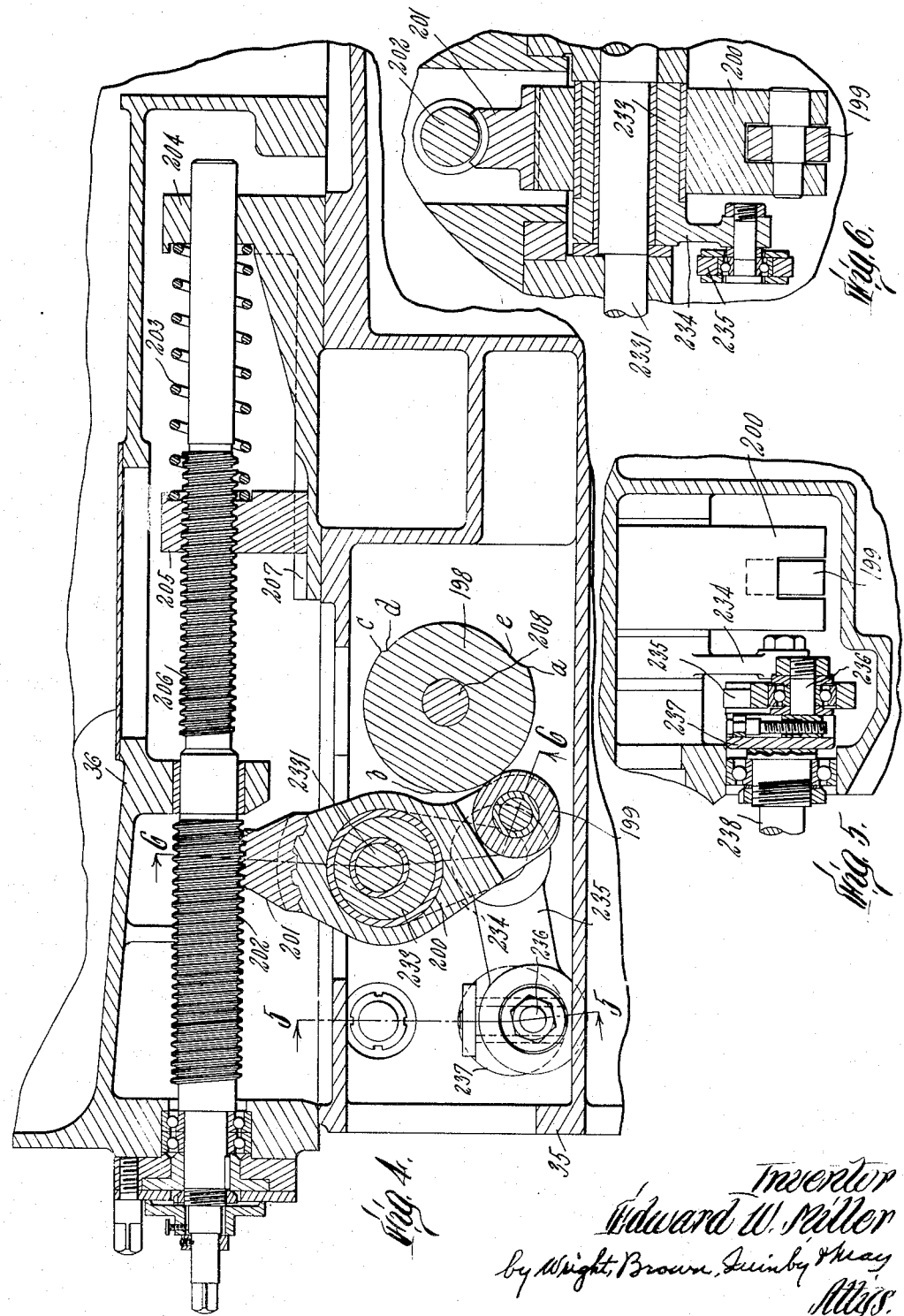

Dec. 14, 1954     E. W. MILLER     2,696,762
GEAR FINISHING MACHINE
Filed June 17, 1950     11 Sheets-Sheet 4
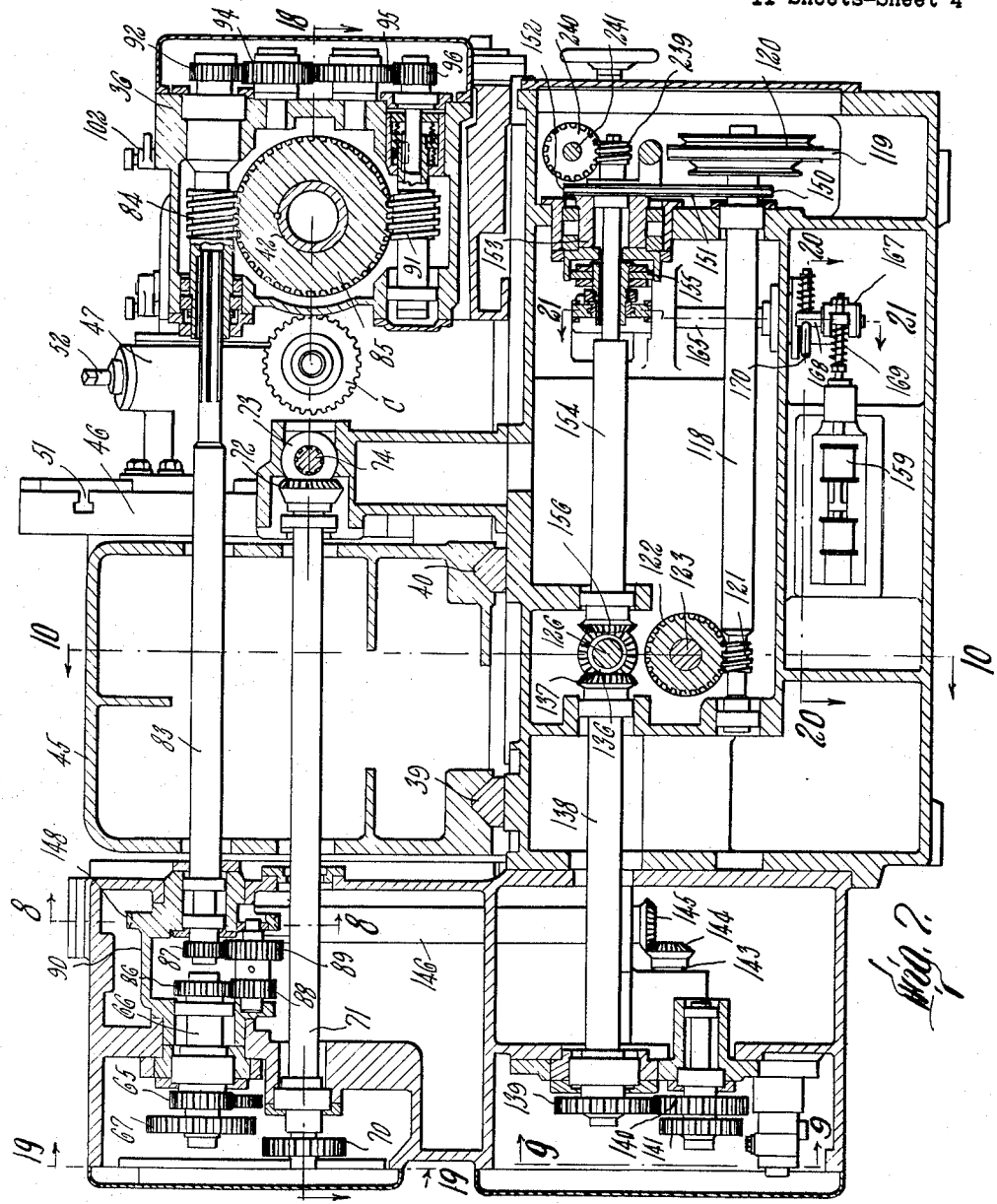
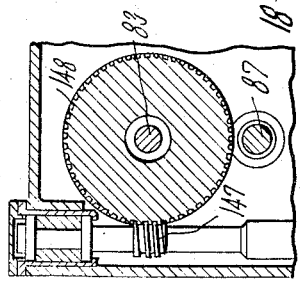
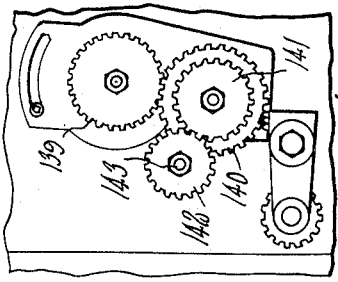

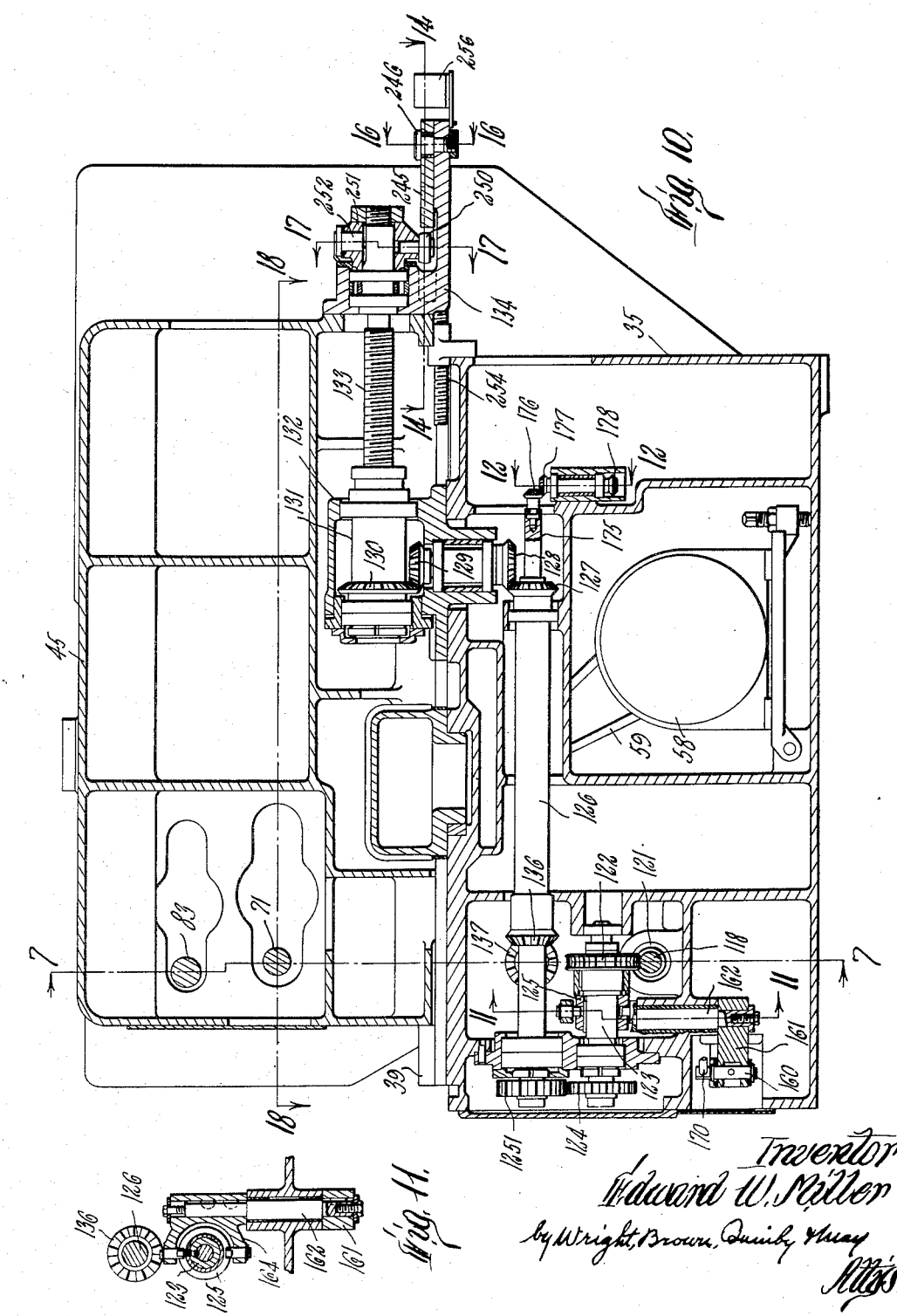

Dec. 14, 1954
E. W. MILLER
2,696,762
GEAR FINISHING MACHINE
Filed June 17, 1950
11 Sheets-Sheet 6
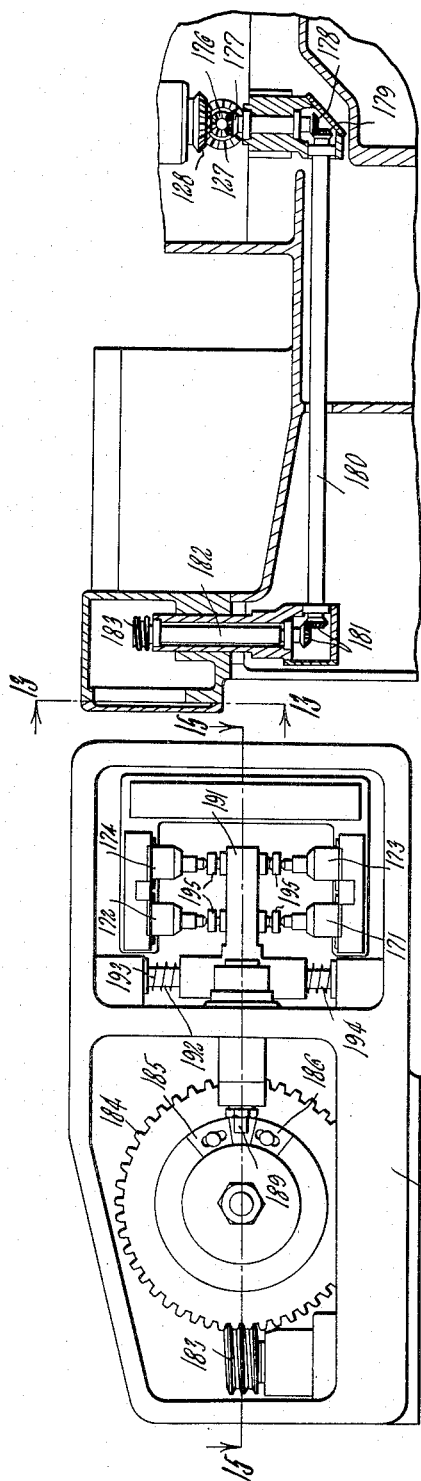
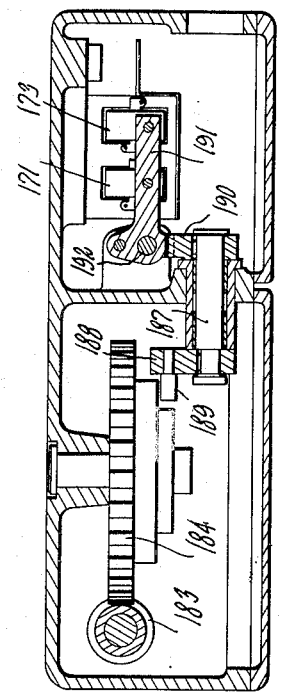
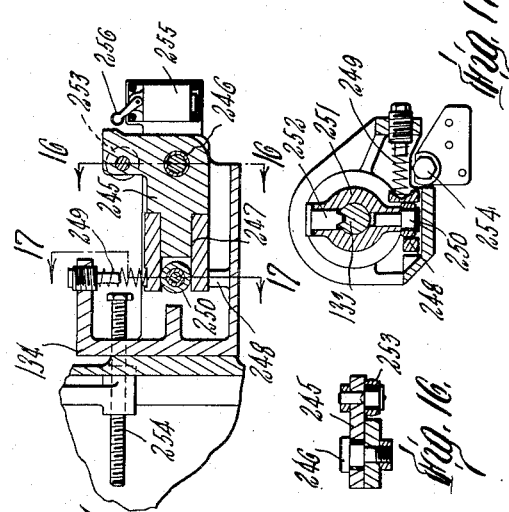

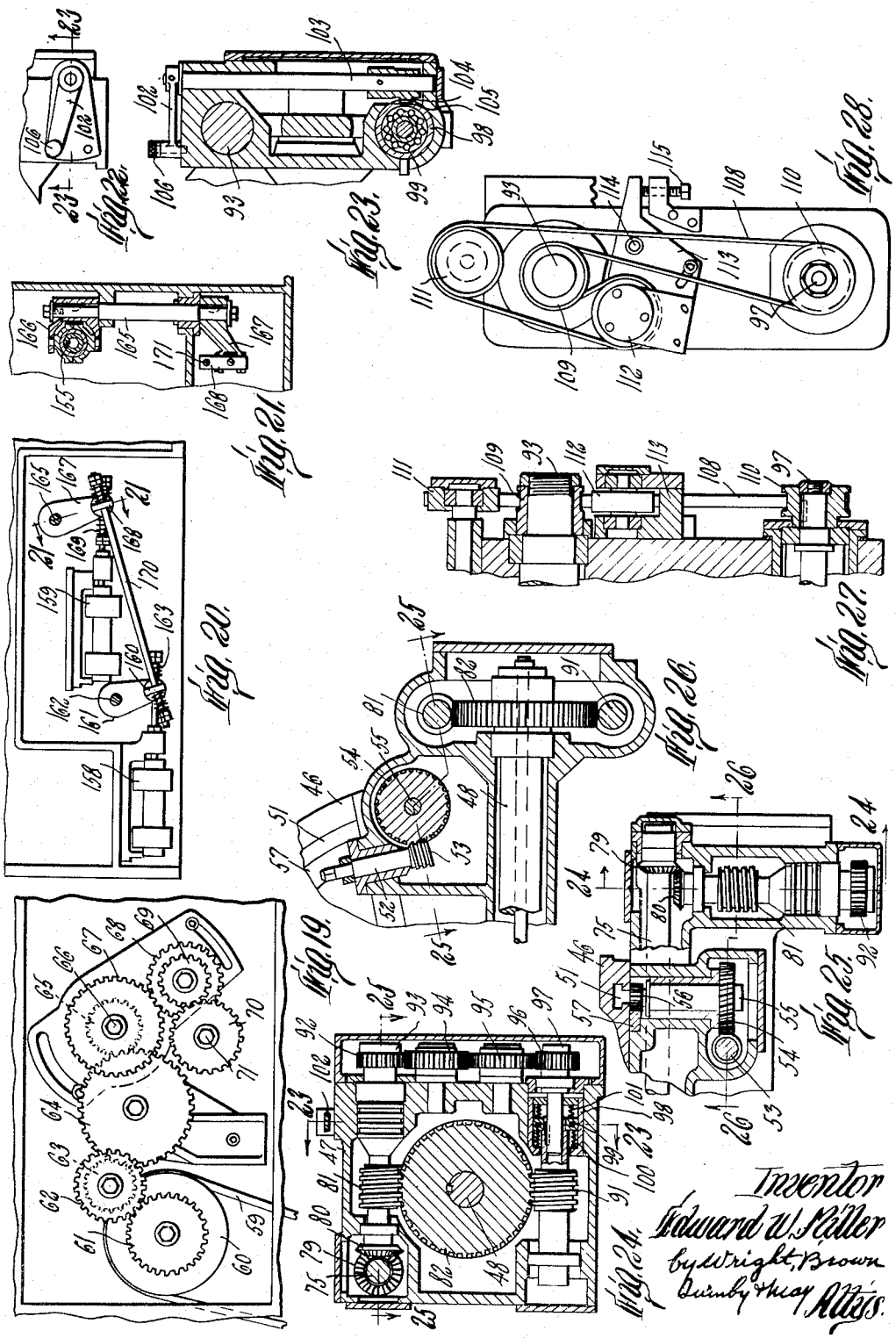

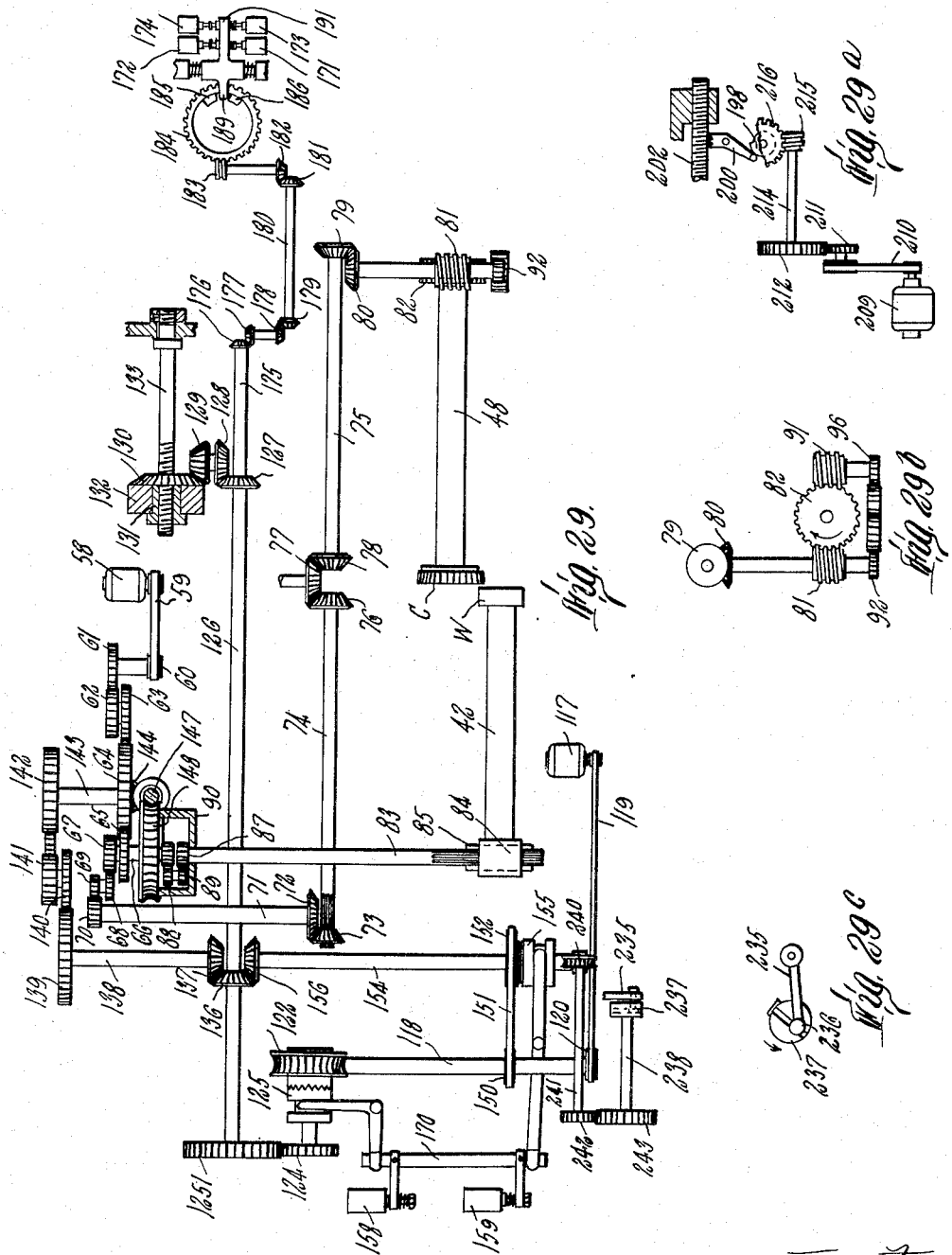

Dec. 14, 1954   E. W. MILLER   2,696,762
GEAR FINISHING MACHINE
Filed June 17, 1950   11 Sheets-Sheet 10
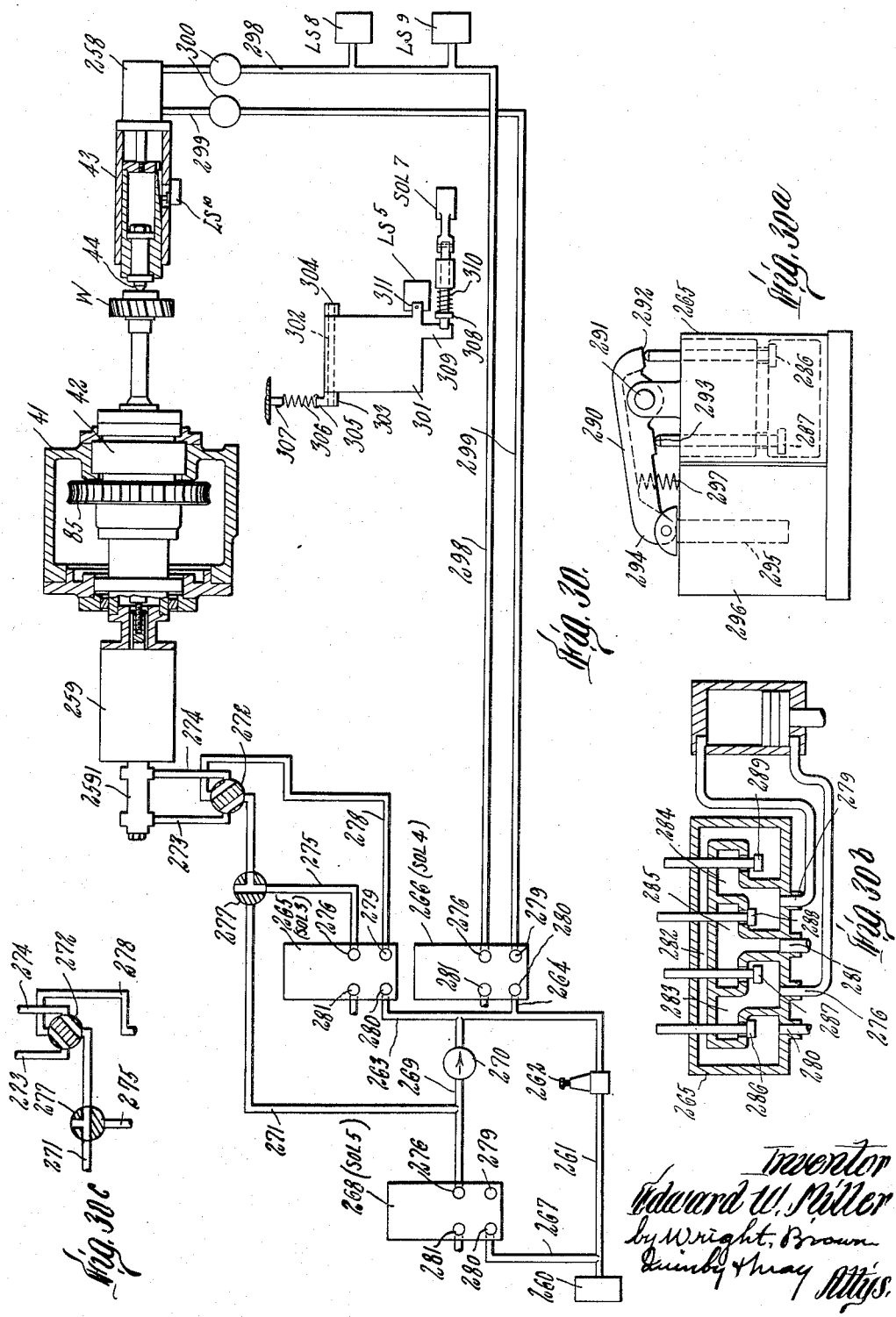

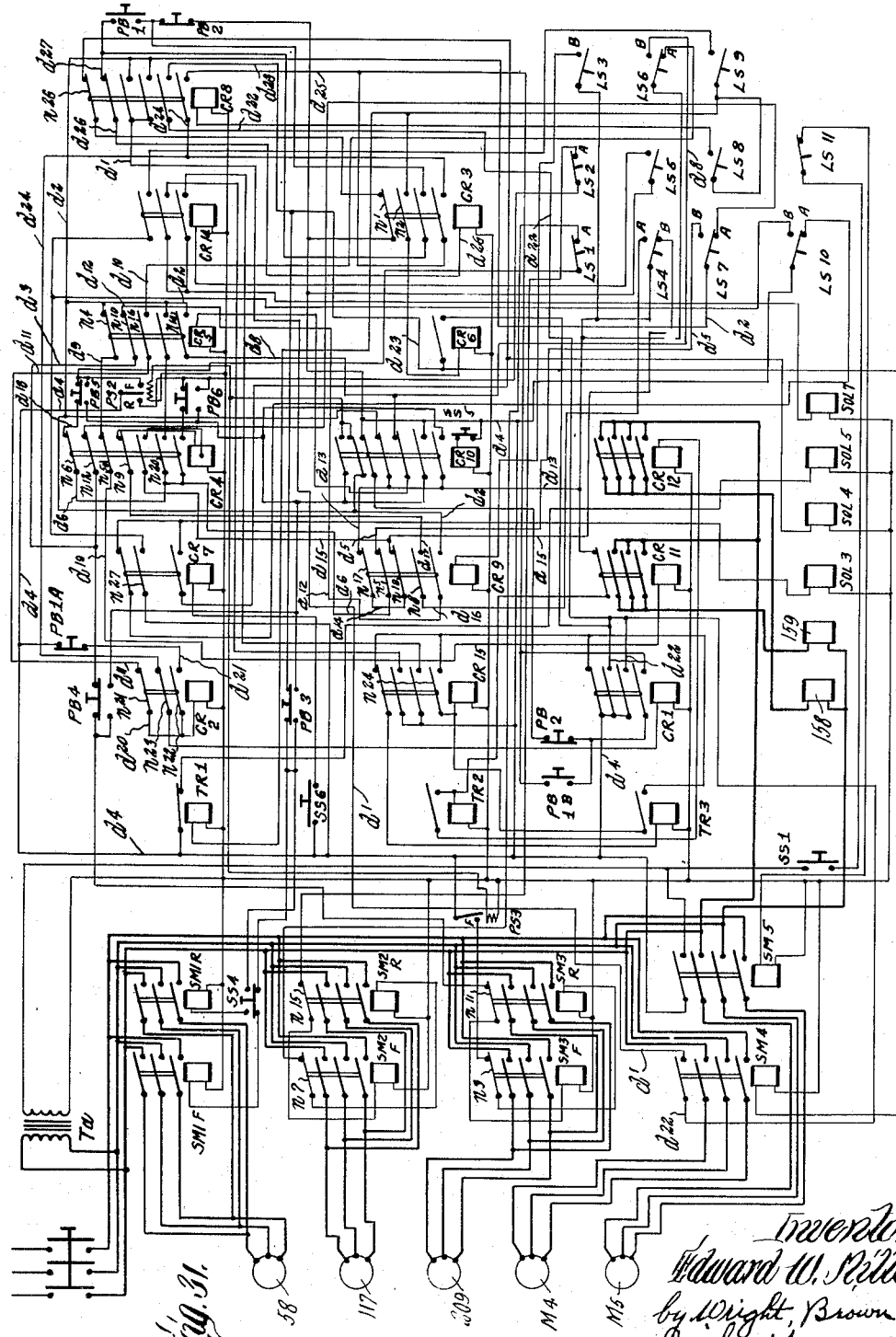

United States Patent Office

2,696,762
Patented Dec. 14, 1954

2,696,762

GEAR FINISHING MACHINE

Edward W. Miller, Springfield, Vt., assignor to The Fellows Gear Shaper Company, Springfield, Vt., a corporation of Vermont Application June 17, 1950, Serial No. 168,821

10 Claims. (Cl. 90—1.6)

The present invention is concerned with machines for finishing the teeth of gears to a high quality of form, dimensions and smoothness after having been cut to approximately final form and dimensions. It has for one of its objects to effect the finish cutting operation by means of a cutter of the gear shaper type; that is, one having peripheral teeth with cutting edges at one end only and clearance at the sides, and by passing the cutter lengthwise of the work piece at a relatively slow speed while rotating both cutter and work at a relatively high speed with a speed ratio proportional to their respective numbers of teeth.

The invention consists of a complete machine for this purpose having mechanisms and controls effective for performing automatically all the movements and operations necessary to give effect to the stated purpose. It also includes equivalents of the mechanisms and combinations embodied in the machine which is hereinafter described and shown in the accompanying drawings for illustration of the invention.

In the drawings,

Fig. 2 is a horizontal detail section taken on line 2—2 of Fig. 1;

Figure 1:
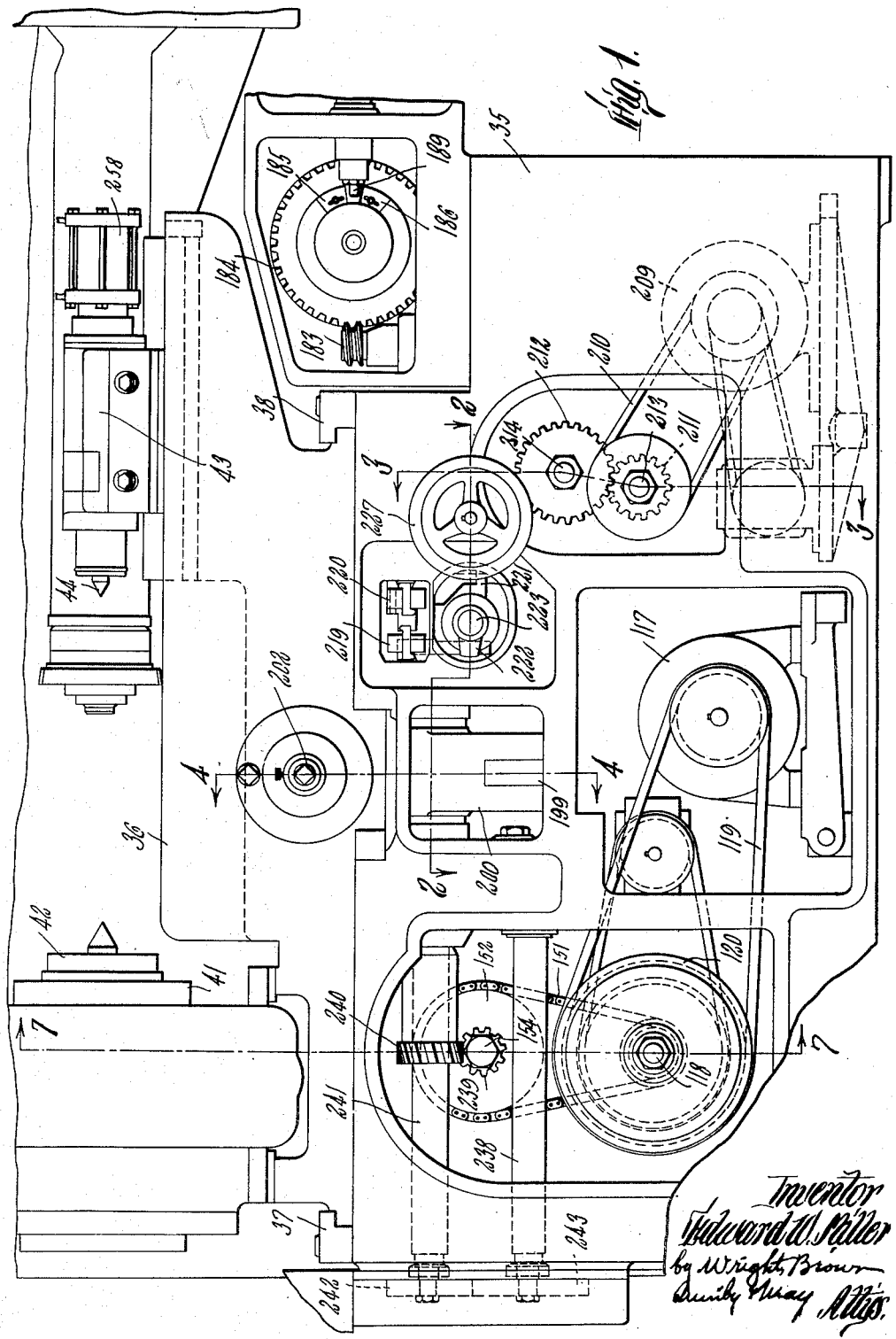
Fig. 1 is a front elevation of the lower part of a gear finishing machine illustrating the principles of the invention in their presently preferred forms.
Figure 18:
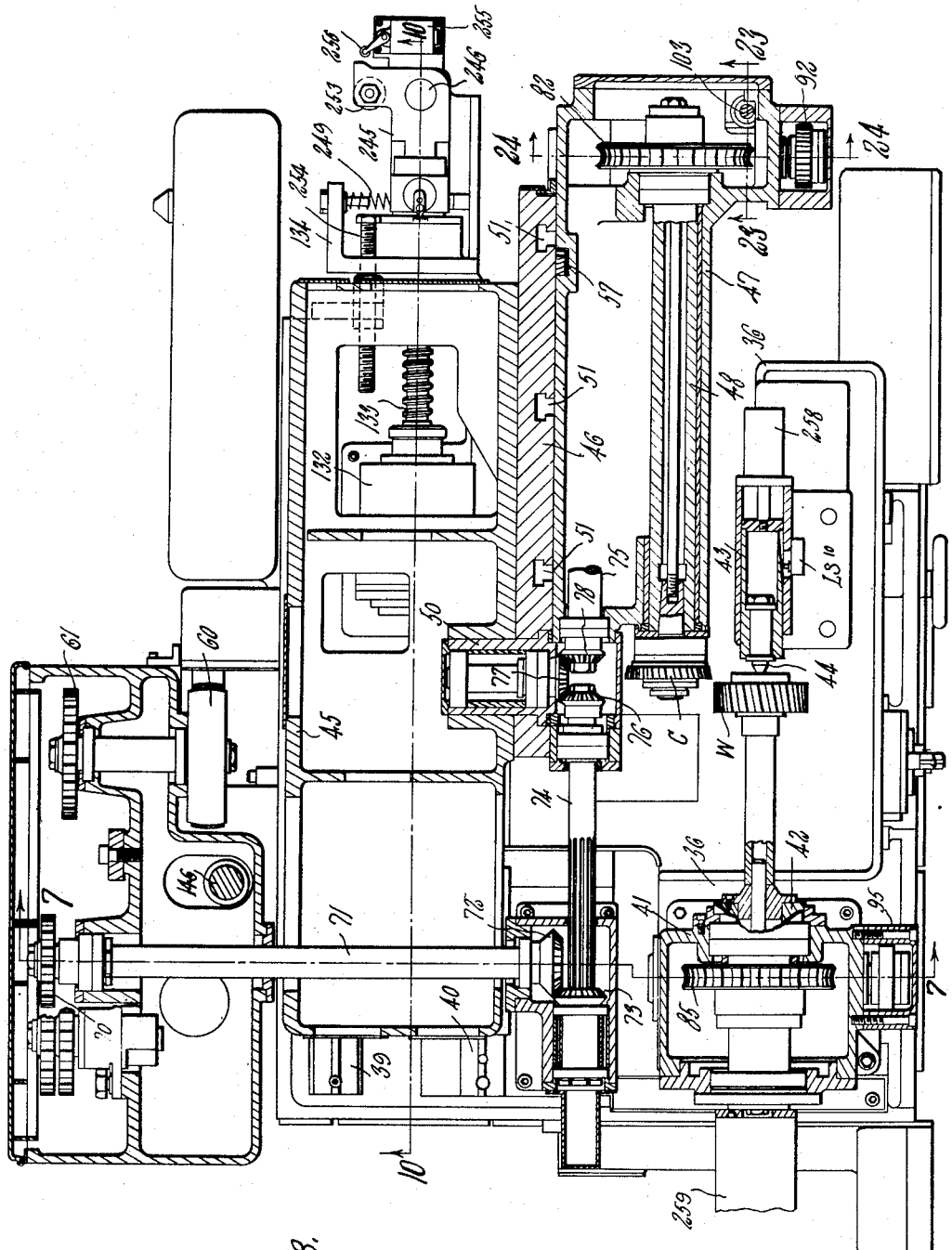

Figs. 3 and 4 are vertical detail sections taken on lines 3—3 and 4—4, respectively, of Fig. 1;

Figs. 5 and 6 are detail sections taken on lines 5—5 and 6—6, respectively, of Fig. 4;

Fig. 7 is a vertical cross section of the machine taken on line 7—7 of Figs. 1, 10 and 18;

Figs. 8 and 9 are detail vertical sections taken on lines 8—8 and 9—9, respectively, of Fig. 7;

Fig. 10 is a vertical section taken on line 10—10 of Fig. 7;

Fig. 11 is a detail section taken on line 11—11 of Fig. 10;

Fig. 12 is a detail section taken on line 12—12 of Fig. 10;

Fig. 13 is an elevation of the parts shown at the right hand side of the line 13—13 of Fig. 12, looking in the direction of the arrows applied to that line;

Fig. 14 is a horizontal detail section taken on line 14—14 of Fig. 10;

Fig. 15 is a section taken on line 15—15 of Fig. 13;

Fig. 16 is a detail section taken on line 16—16 of Fig. 14;

Fig. 17 is a section taken on line 17—17 of Figs. 10 and 14;

Fig. 18 is a horizontal sectional view of the entire machine taken on line 18—18 of Figs. 7 and 10;

Fig. 19 is an elevation of ratio and change gearing shown at the right of the line 19—19 of Fig. 7, looking in the direction of the arrows applied to that line;

Fig. 20 is a section taken on line 20—20 of Fig. 7;

Fig. 21 is a section taken on line 21—21 of Figs. 7 and 20;

Fig. 22 is a plan view of a control lever by which pressure to take up backlash in certain worm and wheel gearing is shifted;

Fig. 23 is a section taken on line 23—23 of Figs. 22 and 24;

Figure 24 is a sectional view taken on line 24—24, Figure 18, showing the cutter rotating mechanism and which mechanism is duplicated for rotating the work piece.

Fig. 25 is a section taken on lines 25—25 of Figs. 24 and 26.

Fig. 26 is a section taken on line 26—26 of Fig. 25;

Fig. 27 is a sectional view, and Fig. 28 an elevation as seen from the right of Fig. 27, of an alternative means for taking up looseness in the gearing by which the cutter and work spindles are rotated;

Fig. 29 is a diagram of the gear and shafting trains by which the cutter and work spindles are rotated and movements are imparted to the cutter and work carriages;

Figs. 29a, 29b and 29c are detail views of some of the mechanisms shown in Fig. 29;

Fig. 30 is a diagram of pneumatic means by which work pieces are mounted and secured to the work spindle;

Fig. 30a is a side view of a solenoid valve which is one of several used in a pneumatic system by which the head stock and tail stock of the work holder are operated to secure and release work pieces;

Fig. 30b is a diagrammatic sectional view of the said solenoid valve;

Fig. 30c is a fragmentary view showing a four way valve and a three way cock, which appear in Fig. 30, in different positions than represented in Fig. 30;

Fig. 31 is a diagram of the electrical equipment by which the movements of the various parts of the machine are controlled.

The machine structure comprises a base 35 (Fig. 1), a work carriage 36 mounted on the base between guides 37 and 38 to be movable transversely of the base, and a cutter carriage, composed of a number of assembled parts described below, mounted on guides 39 and 40 (Figs. 7 and 18) to be movable longitudinally of the base. The work carriage mounts a head stock 41, in which there is a work spindle 42, and a tail stock 43 carrying a center 44, by which work pieces W (gears to be finished) are mounted and rotated.

The cutter carriage comprises a bed 45, a plate 46 rigidly secured to the forward side of the bed, and a saddle 47 in angularly adjustable connection with the plate 46 carrying a cutter spindle 48 on which a cutter C is mounted. The work piece is supported with its axis parallel to the path of travel of the cutter carriage, and the cutter spindle is held by the saddle in a plane parallel to the said path of travel (which may be called the adjustment plane) with a range of adjustment such that it can be placed in that plane at various inclinations to the work spindle axis. The range of adjustment in this machine permits the cutter spindle to be placed either parallel to the work spindle in a plane perpendicular to the adjustment plane, or at a large acute angle, and at intermediate angles. When so inclined, the cutter is operated in what is called, in this art, a crossed angle relationship with the work.

The cutter C is essentially like a helical gear shaper cutter in form, and is made of hard, metal-cutting steel. Its teeth have cutting edges at one end only with side and circumferential clearances, but the cutter can also be used without side clearance. All of the cutting edges may be in substantially the same plane, with or without some top rake, or they may be in planes normal to their helix angle.

The saddle 47 pivots about a quill 50, which is mounted in the plate 46, and in an inwardly projecting boss in the bed, with its axis perpendicular to the cutter spindle axis and coinciding with a diameter of the end face of the cutter.

The saddle is clamped to the plate 46 by bolts (not here shown), of which the heads occupy T shaped slots 51 in the plate concentric with the axis of quill 50. It is adjusted about the pivot axis by an elevating device, shown in Figs. 25 and 26. This device comprises a shaft 52 carrying a worm 53 and adapted to be rotated by a crank applied to its exposed outer end. Worm 53 meshes with a worm gear 54 on a shaft 55 on which a pinion 56 is mounted in mesh with a sector 57 bolted to the face of plate 46 concentric with the axis of quill 50.

Both cutter spindle and work spindle are rotated by a motor 58 (Fig. 10) which, for the purposes of the present description, may be called the main motor. It drives by means of a belt 59 a pulley 60 (Fig. 19), which, through speed gears 61 and 62 and intermediate gears 63, 64 and 65, rotates a shaft 66 to which the gear 65 is splined. From this point the rotation transmitting trains to the two spindles divide.

The train to the cutter spindle comprises a gear 67 on shaft 66 which drives, through ratio gears 68, 69 and 70, a shaft 71 (Fig. 7). The latter shaft carries a bevel gear 72 meshing with a bevel gear 73 on a shaft 74, which drives an alined shaft 75 through bevel gears 76, 77 and 78, of which the gear 77 is mounted in the quill 50 coaxially therewith. Shaft 75 is mounted in bearings carried by the saddle 47 and shaft 74 is mounted in bearings carried by the bed 45. It is splined into gear 73 to permit movement of the cutter carriage which feeds the cutter through the work.

Shaft 75 carries a bevel gear 79 (Fig. 24) meshing with a bevel gear 80 on the same shaft with a worm 81 which meshes with a worm gear 82 keyed to the cutter spindle 48 and by which the latter is rotated.

From the shaft 66 previously mentioned, the rotation drive to the work spindle is through a differential gearing to a shaft 83 alined with shaft 66, a worm 84 into which the end of shaft 83 is splined and a worm gear 85 keyed to the work spindle 42 and meshing with worm 84. The differential gearing consists of sun gears 86 and 87 on the adjacent ends of shafts 66 and 83, and planet gears 88 and 89 mounted in a rotatable housing 90 and meshing with the sun gears.

The speed and ratio gears shown in Fig. 19 are interchangeable with others whereby, through appropriate selection of gears, a wide variety of speeds and speed ratios may be given to the cutter and work gear.

The motor 58 by which these parts are driven is reversible, whereby the cutter and work can be rotated in opposite directions according to the helix angle and hand of the cutter.

Provisions are made for taking up looseness and backlash between the worms and wheels 81—82 and 84—85 by which the cutter and work spindles are rotated. The means for this purpose are shown in Figs. 7 and 24 and are alike as to both gearings. That for the rotation gearing of the cutter spindle will now be described, and the reference characters used in this description are applied to the corresponding parts shown adjacent to the work spindle in Fig. 7.

A worm 91 is meshed with worm wheel 82 at the opposite side thereof from the worm 81 and is driven in the opposite direction at the same speed by a gear 92 on the shaft 93 of worm 81, idle gears 94 and 95, and a gear 96 on a splined extension 97 of the shaft which carries worm 91. Both worms have the same lead and helix angle. Worm 91 is forced by spring pressure against the teeth of gear 82 in the opposite direction to the rotation of the gear by means of springs and a thrust bearing contained in a cage 98 which surrounds the worm shaft and is movable endwise thereof. The pressure is applied in one direction or the opposite direction according to the direction of rotation.

The thrust bearing referred to is a ballbearing 99 having an inner race which is connected to the hub of the worm so that it cannot shift endwise, an outer race and a series of balls between them. The outer race is pressed upon in opposite directions by springs 100 and 101 which abut against the opposite end walls of the cage. Movement of the cage to force either set of springs, 100 or 101, against the thrust bearing is effected by a handle 102 (Figs. 22 and 23) secured to a shaft 103 on which is fixed a pinion or segment 104 meshing with a longitudinal series of rack teeth 105 on the adjacent side of cage 98. The handle 102 is mounted at the outer side of the housing in which the worm and gear mechanism is contained and is provided with a locking pin 106, whereby it is secured in either of its positions.

An alternative backlash take-up is shown in Figs. 27 and 28. Here the worm shafts 93 and 97 are connected by a belt 108 which passes around pulleys 109 and 110 on the respective shafts and also around a guide pulley 111 and take-up pulley 112. The diameter of pulley 109 is smaller than that of pulley 110 so that a drag is applied to the backlash take-up worm 91 due to the slower speed of the belt on pulley 110 than the speed of this pulley. The worm and gear have a steep helix angle which causes the worm to be driven by the wheel, and the belt tends to retard it. The take-up pulley is mounted on a bracket 113 pivoted at 114 to the housing structure of the mechanism, and a screw 115 is mounted in a stationary bracket to apply pressure to the pivoted bracket in a manner to increase the tension of the belt.

The cutter carriage is moved in a path parallel to the axis of work spindle and work to impart a cutting feed to the cutter from a position clear of the work piece at one end, somewhat as shown in Fig. 18, to a position in which it is clear of the work at the opposite end. This movement may be called the cutting feed traverse. It is effected by a motor 117, which may be called the cutting feed motor and drives a shaft 118 by means of a belt 119 and pulley 120 (Fig. 1). Shaft 118 carries a worm 121 in mesh with a worm wheel 122 rotatably mounted on a shaft 123. A gear 124 is secured to this shaft and a clutch 125 is splined to it and is movable into and out of clutching engagement with the hub of worm gear 122; the clutch and hub having teeth on their contiguous ends. Gear 124 and a meshing gear 1251 are feed change gears of which the latter is secured to shaft 126. A bevel gear 127 on shaft 126 meshes with a bevel gear 128 on a transverse shaft carrying a bevel gear 129 which meshes with a bevel gear 130 on a lead screw nut 131 which is rotatably mounted and held against endwise movement in a bracket 132 which is secured to the base 35 of the machine. Nut 131 meshes with a lead screw 133 which is held immovably (except for a small degree of controlled rotation) by a bracket 134 secured to the bed 45 of the cutter carriage and movable therewith. The axis of this feed nut and lead screw is, of course, parallel with the guides for the cutter carriage.

An additional increment of rotation is imparted to the work during the cutting and return traverses of the cutter to maintain the correct relationship of helical cutter and/or helical work piece. The direction and amount of the incremental rotation are determined according to the helix angle of the cutter or work piece, or the sum or difference of their respective helix angles. The incremental rotation is caused by rotation of the differential gear housing transmitted from shaft 126 by bevel gears 136, 137, shaft 138, ratio gears 139, 140, 141 and 142, shaft 143, bevel gears 144 and 145 and shaft 146. The last named shaft carries a worm 147 (Fig. 8) in mesh with a worm gear 148 rigidly connected with the differential housing 90.

Return traverse of the cutter and reverse rotation of cutter and work piece is accomplished at a higher rate of speed than the cutting traverse. The shaft 118 carries a sprocket 150 which drives, by means of a chain 151, a sprocket 152 secured to a hub 153 which is loose and free to rotate on a shaft 154 but can be coupled thereto by a sliding clutch 155, which is splined to the shaft. A bevel gear 156 meshes with gear 136 on shaft 126 and, through the latter, with gear 137 on shaft 138. Rotation is transmitted to the nut 131 and differential housing 90 through the same trains of mechanism previously described. Cutting feed motor 117 is reversible, and is reversed to return the cutter to starting position. As the worm and wheel gearing 121, 122 is bypassed by the reverse driving connections to shaft 126, the return traverse is more rapid than the cutting traverse.

The clutches 125 and 155 are coupled and uncoupled in alternation. Clutch 125 is connected with a solenoid 158 (Fig. 20) to be coupled with worm gear 122 when the solenoid is energized; and clutch 155 is connected with a solenoid 159 to be coupled with the sprocket hub 153 when the latter solenoid is energized. The mechanical connections by which each solenoid actuates its connected clutch are shown in Figs. 7, 10, 11, 20 and 21.

Referring to Figs. 10, 11 and 20, the core of solenoid 158 is provided with an extension rod which passes through a pin 160 swiveled in an arm 161 secured to one end of a rock shaft 162. This solenoid acts with a pulling effect on arm 161 and a buffer spring 163 is mounted between an abutment on the outer end of the extension rod and the swivel pin 160. Rock shaft 162 is mounted in a bearing in the base frame structure and extends beside the clutch 125. It carries a forked arm 164, which embraces clutch 125 and carries pins entering a circumferential groove in the clutch.

Similar connections are provided between the solenoid 159 and clutch 155 (Figs. 7, 20 and 21) consisting of a rock shaft 165 carrying a forked arm 166 which embraces the clutch, and a second arm 167 carrying a pin 168 through which an extension rod from the core of solenoid 159 passes. The action of solenoid 159 is a pushing action and a buffer spring 169 is interposed between pin 168 and an abutment on the extension rod.

In order to insure disconnection of each clutch when its solenoid is deenergized and the other solenoid is energized, a coupling rod 170 is passed through holes in the pins 160 and 168, and carries buffer springs between these pins and abutments on its outer ends.

The alternate activation of the solenoids 158 and 159 to limit the travel of the cutter in each direction is controlled by limit switches 171 and 172 (Fig. 13). Associated with the limit switches are two safety switches 173 and 174, the purpose of which is to stop the machine in case either of the limit switches should fail to stop the cutting feed motor. All of these switches are mechanically actuated by the shaft 126, which is in the train of the driving mechanism for the cutter carriage. An extension 175 (Fig. 10) of shaft 126 carries a bevel gear 176 which, through bevel gears 177, 178, 179, shaft 180 (see also Fig. 12), bevel gear pair 181 and shaft 182 drives a worm 183 in mesh with a worm gear 184 (Figs. 13 and 15).

Worm gear 184 has a circular graduated dial in one face to which dogs 185 and 186 are adjustably secured. A rock shaft 187 carries an arm 188 having a stud 189 projecting into the path of the dogs. It also carries a gear segment 190 meshing with teeth on a bracket 191 which is mounted to slide on a guide rod 192 and is held in neutral position by springs 193 and 194. The sliding bracket extends between the limit and stop switches 171 and 173 on one side and the limit and stop switches 172 and 174 on the other side, and carries screws 195, which engage the switches when the bracket is raised and lowered. The worm gear 184 is rotated clockwise during feeding travel of the cutter carriage so that dog 185 causes the limit switch 171 to be closed and stop the travel of the carriage at the prescribed point. It is rotated in the opposite direction during return travel and then dog 186 closes switch 172 at the prescribed time; the times of stopping in both directions of travel being determined by setting of the dogs 185 and 186.

The work carriage is movable transversely to accommodate work pieces of different diameters, to place the carriage in loading position, withdraw it to allow return of the cutter to the position from which the cutting action is started, and to place and hold the work in cutting relation with the cutter. These last mentioned placements are effected automatically by a depth feed cam 198 (Fig. 4) which bears against a roller 199 on one arm of a lever 200, the other arm of which carries a gear segment 201 meshing with the threads of an adjusting screw 202 which is anchored rotatably in the work carriage. The perimeter of the cam is formed with a concentric high dwell from *a* to *b*, which holds the work up to the cutter during cutting traverses; a gradual drop from *b* to *c* for loading; a sharp drop from *c* to *d* to back off the work for return traverse of the cutter; a low dwell from *d* to *e* for holding the work while the cutter returns; and a gradual rise *e–a* from the low to the high dwell.

The work carriage is loaded to take up looseness and backlash between the feed screw and cam by a spring 203, which surrounds an extension of the screw 202 and bears at one end on a bracket 204 rigidly secured to the base structure. The other end of the spring bears against a nut 205 which is adjustably mounted on a threaded extension 206 of screw 202 and is normally prevented from rotating by a groove 207 in a part of the base structure, into which a projection at one side of the nut is seated and in which it is adapted to slide.

Cam 198 is secured to a shaft 208 which is rotated by a depth feed motor 209 (Fig. 3), belt and pulley drive 210, meshing gears 211 and 212 on shafts 213 and 214, respectively, and a worm 215 on shaft 214 in mesh with a worm gear 216 which is rotatable about the cam shaft 208 and is coupled thereto by a pawl 217 carried by the worm wheel and engaged with a ratchet 218 fixed to the shaft.

The cycle of the depth feed cam 198 and its stopping points are controlled by the limit switches 171 and 172 and related limit switches 219 and 220 (Fig. 1). These last mentioned switches are controlled by dogs 221 and 222 on a shaft 223 which is driven from the cam shaft 208 by bevel gears 224 and 225. Dog 221 is keyed to shaft 223 and dog 222 is adjustable about the shaft and is held in adjusted position by a clutch 226.

For large adjustments to bring work gears of different diameters into proper relation with the cutter, the depth feed screw 202 is rotated by a crank applied to its outer end. The depth feed cam may be rotated to accommodate such locations of the carriage by a hand wheel 227 on the outer end of a shaft 228 which carries a pinion 229 arranged to be put in mesh with the teeth of a face gear 230 which is keyed to the cam shaft 208. A spring 231 normally holds the shaft 228 in its inward position with the gear 229 out of mesh with the face gear 230, but permits the shaft to be pulled out endwise so as to bring the pinion and face gear into mesh.

A part of the depth feeding mechanism can be used to crown the work gear by making parts of its teeth between their ends slightly thicker than other parts. For this purpose the lever 200 is mounted on an eccentric sleeve 233, which in turn is mounted and rotatable on a supporting shaft 2331. Sleeve 233 carries an arm 234, which is coupled by a link 235 with a crank pin 236. This crank pin is mounted and adjustable radially on a crank disk 237 carried by a crank shaft 238. The crank shaft is driven by shaft 154, worm 239 (Figs. 1 and 7), worm gear 240, shaft 241, and change gears 242 and 243, the latter being secured to the crank shaft 238. Then, as shaft 154 rotates while the cutter is traveling across the work, the pivot axis of lever 200 is shifted back and forth, causing the work to be withdrawn from and advanced toward the cutter. The amount of the movement so caused is governed by selection of appropriate change gears 242 and 243 and by radial adjustment of the crank pin 236.

A correction is applied to the cutter traversing mechanism to complensate for rotational lag of the cutter due to the fact that there is a longer train of mechanism from the power source to the cutter spindle for rotating it than from the power source to the work spindle. This inequality of drive is most comprehensively shown in the mechanical diagram, Fig. 29, but it appears also in a comparison of Figs. 7 and 18. Gears 72, 73, splined shaft 74, gears 76, 77, 78, shaft 75 and gears 79 and 80, are all members additional to, or in excess of, those employed to rotate the work spindle. Due to necessary clearances for lubrication and free running, these parts introduce a significant amount of cumulative backlash which, if not compensated for, would cause the cutter to bear harder on the teeth of the work piece at one side than at the other, and to remove more stock on that side.

The means here provided to compensate for that condition comprises a level 245 (Figs. 10, 14, 16, 17 and 18), coupled by a pivot stud 246 with the bracket 134, which is secured to the bed portion 45 of the cutter carriage, and has a forked arm 247 extending from pivot 246 in the direction of cutting travel of the carriage. This forked arm is normally held against a stop 248 on the bracket 134 by a spring 249. The branches of the forked arm 247 embrace a roller stud 250 projecting from a collar 251, which surrounds the lead screw 133 and is secured nonrotatably thereto by a key 252. Lateral movement of arm 247 thereby imparts an increment of rotation to the screw.

As the cutter carriage nears the end of its working traverse, a roll 253 carried by an offset arm of lever 245 strikes a stop 254 fixed adjustably in the base structure of the machine and displaces the lever so that the screw is rotated counterclockwise through a small angle just as the carriage reaches the end of its travel. The angle through which it is thus rotated may be varied by appropriate adjustment of the stop screw.

This rotation of the screw causes the carriage to be displaced endwise a short distance in addition to that produced by the feeding mechanism. Thereby one side of the cutter teeth are caused to bear harder against one side of the work teeth, due to their helical arrangement, at the instant the carriage stops. Hence a new work piece, when loaded on the work carriage in free mesh with the cutter, will be slightly out of its true position angularly with respect to the lead screw. Thereafter, when the new work piece has been clamped tightly to the work spindle and the cutter is returned to starting position, the lever 245 is returned to its normal position by spring 249 and the cutter teeth are displaced with respect to the work gear teeth by the amount predetermined as sufficient to correct the unequal bearing due to the lag described.

A safety limit switch 255 is mounted on the bracket 134 near lever 245 and has an operating arm extending so close to the offset arm of lever 245 that it will be displaced by said arm to open the switch 255 if the lever should be shifted about its pivot 246 more widely than is required for the normal incremental advance of the cutter carriage.

The tailstock quill or slide which carries the center 44 and the work spindle 42, which contains an arbor or collet or center, are movable each toward and away from the other by pistons contained in pneumatic cylinders 258 and 259, respectively (Figs. 18 and 30). The work is loaded by being placed in the loading position and the head and tail stock centers or arbors are brought against it under light pressure sufficient to hold it in position but light enough to permit independent rotation. It is rotated in mesh with the cutter for a long enough time to effect even bearing of the teeth of both on both sides. Then the work is clamped under heavier pressure firmly enough to maintain it in correct position while the cutting action takes place. The reason for lightly clamping the work and rotating it before clamping it tightly is to allow the spindle-rotating driving trains of the machine to take up any lag and back lash before the cutting operation begins.

Fig. 30 shows in diagrammatic form the pneumatic system by which air at different pressures is admitted to the headstock and tailstock cylinders and released therefrom. Air is compressed into a container 260 by a motor driven pump which forms part of the equipment of the machine. This pump does not appear in the structural drawings of the machine and its motor is shown only in the electrical diagram, designated M4.

A pipe line 261 leads from the pressure source 260 to a reducing valve or low pressure regulator 262 and an extension of the line from said regulator is connected by branches 263 and 264 with solenoid operated valves 265 and 266, of which the first controls the admission and exhaust of air supply to and from the headstock cylinder, and the other controls the air for operating the tailstock cylinder.

A branch 267 from the pipe line 261 leads to the inlet 280 of a third solenoid operated valve 268. A pipe line 269 containing a check valve 270 leads from port 276 of valve 268 to the line which is connected by the branches 263 and 264 with the valves 265 and 266. A branch 271 leads from the pipe line 269 to a four way valve 272, the casing of which has ports connected by pipes 273 and 274 with a stationary fitting 2591 coupled with the opposite ends of the headstock cylinder 259, (which rotates with the work spindle); said fitting having means for conducting air from the opposite ends to the corresponding ends of the cylinder. A pipe 275 leads from a port in valve 265 to connection with the pipe line 271, and in the junction of these lines a three way cock 277 is located, which can be set to conduct air exclusively from the port 276 of valve 265 to valve 272, (as shown in Fig. 30), or, when set as shown in Fig. 30c, to direct air exclusively from the pipe line 271 to valve 272. Another pipe line 278 leads from port 279 of valve 265 to a port in the casing of the four way valve 272.

The three valves 265, 266 and 268 are all alike in this installation, and an illustrative one, which may be the valve 265, is shown in detail in Figs. 30a and 30b. The valve casing contains an inlet port 280, the ports 276 and 279 previously mentioned, an exhaust port 281, and interior partitions dividing the interior space 282, into which air from the inlet is delivered, from a space 283 communicating with port 276, a space 284 communicating with port 279, and a space 285 communicating with the exhaust port 281. A port between the spaces 282 and 283 is controlled by a valve body 286; a port between the spaces 283 and 285 is controlled by a valve body 287; a port between the spaces 284 and 285 is controlled by a valve body 288; and a port between the spaces 282 and 284 is controlled by a valve body 289. For convenience, these valve bodies are shown in the diagrammatic Fig. 30b in a single row. But in the structural embodiment as shown in Fig. 30a, the valves 286 and 288 are shown in one row, and the valves 287 and 289 are shown in a second row spaced apart to the rear from the first mentioned row. The valve stems project through the top of the valve casing. An operating lever 290 is mounted on a pivot 291 on the top of the valve casing and has an arm 292 overlying the stems of valves 286 and 288; a second arm 293 overlying the stems of valves 287 and 289; and a third arm 294 which is connected with the core 295 of a solenoid 296 mounted on the same base with the valve 276. When the solenoid is energized, the valve bodies occupy the positions shown in Figs. 30a and 30b; valve bodies 287 and 289 being open and 286 and 288 being closed. When the solenoid is deenergized, a spring 297 shifts the operating lever and reverses the positions of the valve bodies. Springs, not shown, are suitably arranged to close the several valve bodies when the pressure of the operating lever 290 on them is released. With the valve bodies in the positions here shown, inlet air is enabled to flow through port 279 to the pipe line 298 which leads therefrom to one end of whichever cylinder the pipe may be connected, and port 276 is open to the exhaust for release of air from the opposite end of the cylinder.

The ports 276 and 279 of valve 266 are connected by pipe lines 298 and 299 with the opposite ends of tailstock cylinder 258. Shut off valves 300 are connected in these lines for the purpose of immobilizing the tailstock center when the head stock arbor or collet is used alone to secure the work. The piston or plunger in the pneumatic cylinder 259 of the headstock is operable to push the work spindle arbor or collet forward to cooperate with the tailstock center in grasping work pieces, or to pull it back when the work pieces operated on are a type having a short stem which can be grasped by a collet and held so that the gear is close to the end of the spindle. It is for this reason that the four way valve 272 is provided, which can be placed in position to connect pipe lines 273 and 275 leading to the left hand end of the fitting 2591, as shown in Fig. 30, or to connect pipe line 274 with either of the lines 271 or 275, depending on the position of the three way cock 277, as shown by Fig. 30c. By appropriate setting of the valves 272, 277 and the valve bodies in valve 268, either low pressure or high pressure air can be admitted to either end of cylinder 259 and released from the opposite end of the cylinder. The degree or intensity of the air pressures is not a feature of the invention. It is necessary only that the high pressure, when applied against the full area of the pistons within the pneumatic cylinders be great enough to clamp the work firmly, and that the low pressure be only enough to hold the work stably in position, but not so tightly as to prevent its finding its properly centered relation with the cutter.

Although the solenoid valve 268 is like the other two, its function is only to admit high pressure air to the pipe lines 269 and 271 when required; therefore its port 279 is not used and is permanently closed by a plug, or otherwise suitably.

The solenoids of the three valves 265, 266 and 268 are distinctively designated in the electrical diagrams by the symbols Sol 3, Sol 4, and Sol 5, respectively.

The machine is provided by a work guard which extends across in front of the space wherein the work piece is located between the headstock and tailstock. It is pivoted to the work carriage on a horizontal axis above this space. It does not appear in any of the structural drawings, for the only figure of these drawings (Fig. 1) in which it could be shown does not include enough of the upper part of the machine structure to contain the pivot of the guard. It is shown in the diagram, Fig. 30, and is there identified by the reference character 301. Its hinge pivot is a rod 302 mounted in brackets 303 and 304. A short arm 305 is secured to one end of the hinge rod and is connected with a spring 306, which is anchored at 307 to a part of the work carriage structure. The spring is biased so that it tends to raise the guard and hold it elevated, leaving open the space in which work pieces are mounted. A latch 308 overlaps a lug 309 on the lower end of the guard to secure the guard in the lowered position where it is placed at the beginning of the work cycle of the machine. The end of the latch and adjacent side of lug 309 are beveled so that the lug will pass the latch, retracting it, when the guard is lowered, and the latch is then advanced by a spring 310 to overlap the lug. The latch is connected with the core of a solenoid Sol 7 which, when energized, withdraws the latch and permits the guard to be raised by its spring 306. A switch LS–5 is located besides the lowered position of the lower end of the guard and is operated when the guard is lowered, by a lug 311, which projects from the side of the guard at its lower end.

A limit switch LS–10 is mounted on the body of the tailstock and is actuated by a sloping surface on the tailstock quill. Pressure switches LS–8 and LS–9 are connected with the pipe line 298 which leads to the head end of cylinder 258. These pressure switches include members shiftable by fluid pressure and so arranged that, when so shifted, they close the switches. They are adjustable to set the pressures at which they will so operate.

The following is a description of the electrically controlled operation of the machine, with reference particularly to the pneumatic diagram, Fig. 30, and the electrical diagram, Fig. 31. In the electrical diagram there are a number of magnetically controlled switches including a solenoid coil and one or more contacts or circuit closers coupled to the core of the solenoid. Those applied to start the motors and reverse some of them are designated by the symbols SM with distinguishing designations. There are also a number of similar switches in secondary circuits with, in some instances, interlocking and latching connections arranged to control the motor switches. These are called contactors and are designated by the symbol CR with identifying numerals, which symbols in the drawing are applied to the coils of the several contactors. There are three timers of a known commercial type, designated TR with distinguishing numerals, connected in some of the circuits controlled by the contactors with the function of delaying the activation of the electrical element to which current is supplied by those circuits. Other switches, designated PB with distinguishing numerals are of push button type.

All the motors and their forward and reversing switches are connected in the power circuit. A transformer $Ta$ induces current in the secondary circuits.

The cycle of machine operations ends when the cutter has completed its working stroke. This stroke is adjusted to end when the cutting edges of the cutter teeth protrude from the end of the work piece, but the teeth back from the cutting edges are still in mesh with the teeth of the work piece. At this time the finished work piece is removed and a new piece is placed in position to be clamped between the headstock spindle and the tailstock center. First will be described the operations when the work piece is clamped between the headstock spindle and the tailstock center. The shut off valves 300 are then open to allow free flow of air into and out of the tailstock cylinder 258. The four way valve 272 is set to apply air pressure to the cylinder 259 to push the spindle arbor toward the work, and the three way cock 277 is set to conduct air between pipe 275 and valve 272. These settings are accomplished manually. Selector switch SS6 is turned to head and tail stock position, leaving contactor CR7 deenergized for all of the clamping operations in which both head and tail stocks cooperate. All the contacts of contactor CR7 remain in the positions shown in the wiring diagram. The previously open starting switch PB1 is then closed, whereby the coil of contactor CR3 is energized and the normally closed contact $n^1$ of this contactor is opened and solenoid 4 (valve 266) is deenergized. At this time the timer TR1 is closed, leaving solenoid 5 (valve 268) energized and shutting off the high pressure at this valve. Valve 266 exhausts the tailstock unclamp line 299 and applies low pressure to the tailstock clamp line 298, advancing the tailstock and causing the tailstock quill to shift limit switch LS10 into closed relation with its contact B and open relation with its contact A. The pressure then existing in line 298 closes limit switch LS9.

Opening of switch LS10 at A deenergizes Sol 3 (valve 265), exhausting the headstock unclamp line 278 and applying low pressure to the headstock clamp line 275. In this action the tailstock center applies the clamping pressure and the pressure in the headstock cylinder bears on the arbor in the work spindle to keep the work centralized. At this stage the work piece is clamped lightly. The operator now lowers the previously raised guard 301 by hand, latching it by means of latch 308. When thus lowered, the guard closes limit switch LS5, thereby energizing contactor CR14 and closing its several contacts. The coil of contactor CR6 is energized through the now closed contact $n^2$ of the energized contactor CR3 which energizes the coil of contactor CR6 and starts the timer TR1 through the now closed contact $n^2$ of energized contactor CR3, pressure switch LS9 in this circuit having been closed when low air pressure was applied.

When contactor CR6 is energized, it closes its single contact and energizes starter SM1F, thereby starting motor 58 which rotates the cutter and work piece. The coil of switch SM4 is also energized, closing the contacts of that switch, thereby starting motor M4 which drives a compound pump (not shown), which compresses air for the pneumatic system. Motor 58 runs for a sufficient length of time to take up all backlash in the driving members of cutter and work spindle. After a predetermined time setting, the contact of timer TR1 is opened, deenergizing Sol 5 of valve 268 and allowing high pressure air to flow to the headstock and tailstock cylinders, which tightly clamps the work. Pressure switch LS8, connected in line 298, is set to close when high pressure air is applied, and then energizes contactor CR8, closing a contact of that switch which connects conductors $d^1$ and $d^2$. Thereby the coil of the depth feed motor starter SM3F is energized through previously closed contacts of contactor CR1 and motor starter SM4 by way of closed contact A of switch LS7, a closed contact of contactor CR4, switch PB4 and a closed contact of motor starter SM3R. The depth feed motor 209 is thus started to run in what is considered the forward direction. SM3F and SM3R are reversing starters for the depth feed motor. The switch SM3R is closed with the use of a plugging switch PS3 of a standard commercial type when the switch SM3F is opened so that the motor can be stopped with a minimum amount of cost. Contactor CR4 is a magnetic latching contactor and should be in the latched up position.

Contact $n^3$ of the starter switch SM3F opens when the switch is closed to start the depth feed motor, closing the PS3F contact. Contacts of the contactor CR8 also energize the safety lock-out coils of the plugging switches PS2 and PS3, freeing these switches for normal operation, through a closed contact of contactor CR10. The depth feed motor runs until the closed contact at A of limit switch LS7 opens, deenergizing the coil of switch SM3F and closing the contact $n^3$ of that switch and energizing the coil of switch SM3R, whereby reverse power is applied to motor 209 to slow it down rapidly. Also contacts of switch CR8 through conductor $d^2$, contact $n^4$ of switch CR5, and contact $n^5$ of switch CR4 energize the coil of switch CR11, the contacts of which, being thereby closed, energize the coil of the rapid traverse clutch solenoid 159.

When the contact at A of switch LS7 was opened, its contact at B was closed, whereby the reversing starter SM2 was energized through contact $n^5$ of contactor CR4, $n^7$ of contactor CR4, A of limit switch LS1, $n^7$ of starter switch SM2F, and switch PB5. Thus the traverse, or cutting feed motor, M–117 is started to the right, in reverse, to the position where the cutting traverse of the cutter starts. The contacts of switch SM2R open and plugging switch PS2R closes, due to rotation effecting connection of wire $d^3$ to $d^4$. Contact A of switch LS4 closes and contact B opens. As soon as the cutter carriage starts to the right, contact B of limit switch LS3 closes (as shown at 171 in Fig. 13), energizing the coil of contactor CR9. Contact $n^5$ of contactor CR9 opens the circuit between the conductors $d^5$ and $d^6$, deenergizing coil of switch SM2R, which allows contact $n^{15}$ of SM2R to close and again energizing the coil of SM2F through contacts of PS2R and LS2A (safety switch 173), Fig. 13. This applies reverse power to motor 117, slowing it down, and when the motor has stopped or nearly stopped, plugging switch contact PS2R opens, deenergizing the coil of switch SM2R, a contact $n^8$ of contactor CR9 energizing the total coil of contactor CR4 through switch LS4A, contactor CR9, and contact $n^9$ of CR4, unlatching contactor CR4. The contacts of CR4 which are in the control circuit of the leftward driving motor starter SM2F close, and the contact $n^5$ in the right control circuit of switch SM2R opens, deenergizing the coil of contactor CR11, opening the circuit of solenoid 159 and starting the timer TR2. After the delay for which timer TR2 is set, the coil of contactor CR12 is energized and its contacts energize the slow left traverse Sol 158. This declutches the friction clutch 155, which is the fast traverse clutch for movement of the cutter carriage to the right and engages clutch 125 for movement of the carriage to the left, which is the cutting traverse.

A contact of contactor CR9 also energizes the coil SM3F of the depth feed motor switch through contacts $n^{10}$ of contactor CR5, switch PB4 and contact $n^{11}$ of switch SM3R, starting the depth feed motor 209 and opening the contact $n^3$ of starter switch SM3F. The depth feed motor rotates the depth feed cam shaft 208 and also the shaft 223 which carries the dogs 221 and 222 for actuating the switches 220 and 219 (Fig. 1). Contact B of limit switch LS7 (switch 220 of Fig. 1), reopens, but the adjacent contact $n^5$ of contactor CR9 is already open. Switch LS2A recloses, but adjacent contact of $n^{12}$ of contactor CR4 is already open. When the concentric high dwell of the depth feed cam brings the work into the cutting position, the limit switch LS6A (219, Fig. 1) opens and the contact B of this switch (220, Fig. 1) closes, the coil of contactor CR5 is energized through contactor CR10 and switch LS6B (219); the switch CR5 being locked in through contact $n^{14}$ of the same switch between conductors $d^2$ and $d^8$.

A contact $n^{10}$ of contactor CR5 deenergizes the coil of switch SM3F, allowing contact $n^3$ of that switch to close, energizing the coil of switch SM3R through switch PS3F and applying reverse power to motor 209, slowing it down rapidly, whereupon PS3F opens and the motor stops. Another contact of contactor CR5 energizes the coil of left traverse switch SM2F through contact $n^{15}$ of switch SM2R, contact A of limit switch LS2, switch PB5, and contact $n^6$ of contactor CR4, which starts the motor 117 for propelling the cutter carriage to the left. A contact $n^4$ of CR5 disconnects conductor $d^2$ from conductor $d^9$ in the coil circuit of contactor CR11 which is already deenergized by contact $n^5$ of CR4. Also a contact of CR4 connects conductor $d^{10}$ to conductor $d^{11}$, but switch 219 (contact A of LS6) is open at this moment. Switch 172 (LS3B) opens when the cutter carriage starts to the left, deenergizing the coil of contactor CR9.

A contact $n^5$ of CR9 connects conductors $d^5$ and $d^6$, and another contact of CR9 connects conductor $d^2$ to conductor $d^{12}$, but the contactor CR5 is open. A contact $n^{17}$ of contactor $n^9$ disconnects wire $d^{13}$ from wire $d^{14}$, and another contact, $n^{18}$ of CR9, connects conductor $d^{14}$ to conductor $d^{15}$. Also another contact, $n^8$ of CR9, connects conductors $d^{16}$ and $d^{17}$. When the cutter carriage reaches the left end of the cutting stroke, the upper dog 185 (Fig. 13) actuates switch 171 to open the LS4A contact and close the LS4B contact. The center of coil CR4 is energized through contacts of CR4 and the LS4B contact, latching it up. A contact of CR4 opens and deenergizes coil of switch SM2F, which allows the contacts of SM2F to close and energizing the coil of starter SM2R through switch LS1A (173, Fig. 13) and PS2F. This applies reverse power to motor 117, making it slow down rapidly until switch PS2F opens and the motor stops. A contact of CR4 to the center of the coil of this contactor opens, another contact of CR4 to the full coil of this contactor closes, another coil of CR4 disconnects wire $d^6$ from wire $d^{17}$, another contact $n^6$ of CR4 connects wire $d^6$ to $d^{18}$, and another contact $n^{50}$ connects wire $d^{19}$ to $d^9$, but the adjacent contact of CR5 in circuit with wire $d^9$ is open. Another contact of CR4 closes and energizes the coil of motor starter SM3F through contacts SM3R, PB4 and LS7A. Contact of SM3F opens, depth feed motor 209 starts and runs until switch contact LS6B opens and contact LS6A closes. This stops the depth feed cam at the intermediate position which is the loading position for the next piece of work. This position is one which allows a new piece of work with stock left on it for finishing to be meshed with the cutter without crowding and with as little backlash as possible. The depth feed cam has a gradual descending surface from $b$ to $c$ (Fig. 4), for enabling the work to be set in such an intermediate position, and the cam can be stopped at any position within the limits of this gradual descent to vary the meshing position of the cutter and work, depending on the amount of stock left on a run of gears. The switch contact B of LS6 opens, but coil of contactor CR5 is held energized by contact $n^{14}$ of this contactor. Switch LS6 when closed at contact A, energizes the coil of CR2 through contacts $n^{16}$ of CR5 and $n^{21}$ of CR2.

Contact $n^{21}$ of contactor CR2 disconnects conductor $d^{11}$ from conductor $d^{20}$, but before breaking contact, another contact $n^{22}$ of CR2 connects conductor $d^{20}$ to conductor $d^{21}$, holding coil CR2 energized through switch PB1A. A contact $n^{23}$ of CR2 energizes a lamp (not shown) indicating that the cycle is complete.

A contact $n^{23}$ of CR2 deenergises the coil of contactor CR1. A contact of this latter contactor starts timer TR3, a pair of contacts of the latter contactor discon- nect wire $d^4$ from wire $d^{22}$, deenergizing the coils of starter switches SM4 and SM1F, stopping motor 58; also stopping motor M4 for the compound pump. Wire $d^2$, previously connected to wire $d^{22}$ via wire $d^1$, is disconnected, coil of starter switch SM3F is deenergized, allowing a contact of SM3F to reclose and energize the coil of SM3R which applies reverse power to motor 209 to slow down the motor quickly. Contact F of switch PS3 opens and the motor stops. The lock-out coils of switches PS2 and PS3 are deenergized and the two plugging switches then lock when they get to a neutral position.

The coil of contactor CR5 is deenergized, connecting wire $d^9$ to $d^2$, which is dead, disconnecting wire $d^{17}$ from wire $d^2$, disconnecting wire $d^{10}$ from wire $d^{11}$, disconnecting wire $d^8$ from wire $d^2$, and connecting $d^3$ to $d^{12}$. Because the conductor $d^2$ is dead, the coils of timer TR2 and contacter CR12 are deenergized, releasing the slow traverse solenoid 158 (Sol 1), and clutch 125 becomes disengaged. Timer TR3 times out, while motors 58 and M4 come to a stop. Contact of timer TR3 closes, energizing coil of contactor CR15, which closes a contact $n^{24}$ in parallel with the contact of timer TR3, holding coil of contactor CR15 energized, while deenergizing the coil of timer TR3.

A pair of contacts of contactor CR15 energizes Sol 7, retracting guard latch 308 (Fig. 30), and allowing guard 301 to be raised by its spring 306. At the commencement of the rise of the guard, switch LS5B opens at the contact B, deenergizing the coil of contactor CR14. A pair of contacts of this contactor deenergize Sol 7 and latch 308 is returned by spring 310 to its latching position. Another contact of contactor CR14 deenergizes the coils of contactors CR6 and CR8 and of the timer TR1. A contact of CR6 and a contact of CR8 disconnect wire $d^{23}$ from wire $d^{22}$, which is dead. A contact of CR8 disconnects wire $d^{24}$ from wire $d^{25}$, which is dead. A contact of CR8 connects wire $d^{26}$ to wire $d^{27}$, which is dead. A contact $n^{26}$ of contactor CR8 energizes Sol 4 (valve 266, Fig. 30) through a contact $n^1$ of CR3, and energizes Sol 3 (valve 265) through contact $n^1$ of contactor CR3 and contact $n^{27}$ of contactor CR7. The timer TR1 closes and energizes Sol 5 (valve 268), shutting off high pressure from port 276. Valve 266 releases pressure from the tailstock cylinder 258, allowing the finished work piece to be removed and another new work piece to be substituted.

When the headstock is equipped for clamping the work without benefit of the tailstock, the shut off valves 300 are closed, thus immobilizing the tailstock and the valves 272 and 277 are placed in the positions shown in Fig. 30c. The selector switch SS6 is closed, thereby energizing contactor CR7. The starting switch PB1 is closed, thereby energizing the coil of contactor CR3 and opening the contact of that coil which deenergizes Sol 3 (valve 265) and Sol 4 (valve 266). The high pressure air is still shut off at valve 268 (Sol 5) as timer TR1 is still closed, leaving Sol 5 energized. The work guard is now lowered by hand and latched. From this point on the sequence is the same as previously described in connection with the arrangement where both headstock and tailstock cooperate in clamping the work.

What I claim is:

1. A machine for finishing gears by removing excess stock from a previously cut gear, comprising means for holding a work gear rotatably, a cutter carriage supported to reciprocate in a path parallel to the axis of rotation of the work gear, a rotatable cutter spindle and a gear shaper cutter mounted on said carriage with its axis oblique to the axis of the work piece, mechanism coupled to the work holder and cutter spindle arranged to transmit rotation to both at relative speeds in relative directions like gears running together in mesh, feed mechanism including a disconnectible clutch connected with the carriage to propel it in a path which causes the cutter to traverse the work piece and cut the teeth of the work in traversing, a traverse reversing mechanism, a clutch mounted to be shifted for coupling and uncoupling said traverse reversing mechanism with and from the carriage feeding mechanism, and clutch shifting means organized to shift either of said clutches into coupling position and at the same time shift the other clutch into disengaged position.

2. A machine for finishing gears by removing excess stock from a previously cut gear, comprising a rotatable work holder having means for holding and rotating a work gear, a cutter carriage mounted to reciprocate in a path parallel to the axis of rotation of the work gear, a rotatable cutter spindle mounted rotatably with its axis inclined to the axis of the work holder, a gear shaper cutter of which the teeth have cutting edges at one end and cutting clearance back from such end, mechanism coupled to the work holder and cutter spindle organized to transmit rotation to both at relative speeds and in relative directions like gears running together in mesh, feed mechanism including reversing gears operatively connected with said carriage for propelling the carriage alternately in cutting and return directions, disconnectible clutches engageable separately with the forward and reverse driving gears, and clutch shifting means connected with said clutches and arranged to connect either while disconnecting the other.

3. A machine for finishing gears according to claim 2, in which the clutches are mechanically coupled together to transmit uncoupling movement to either when the other is shifted into coupling position.

4. A gear finishing machine according to claim 1, in which each clutch is provided with an operating arm, one of which is rotatable clockwise for coupling its clutch and anti-clockwise for uncoupling, and the other is movable anti-clockwise for coupling and clockwise for uncoupling, and a connecting rod is connected to both operating arms for coupling either clutch when the other is uncoupled.

5. A gear finishing machine according to claim 2, in which a solenoid is connected with each clutch for shifting it, a switch is connected in circuit with each solenoid and with a source of electrical power and automatic interlocking switches are connected in circuit with the before named switches and with a manually controlled starting switch.

6. A gear finishing machine comprising a rotatable work holder, a rotatable cutter holder, a reciprocable carriage on which one of said holders is mounted, and by which cutting and reverse traverses are effected between a cutter and a work piece, an electric motor, transmission mechanism between said carriage and motor whereby the motor advances the carriage in a prescribed path and including a reversing gear, forward and reverse driving switches connected in the circuit between said motor and a source of electrical power, and control means for said switches connected to open either that may be closed and immediately close the other in order to apply reverse power to the motor and quickly bring it to a stop.

7. A gear finishing machine comprising a rotatable work holder, a rotatable cutter holder, a reciprocable carriage on which one of said holders is mounted, and by which cutting and reverse traverses are effected between a cutter and a work piece, an electric motor, transmission mechanism between said carriage and motor whereby the motor advances the carriage in a prescribed path and including a reversing gear, forward and reverse driving switches connected in the circuit between said motor and a source of electrical power, a second carriage movable transversely of the reciprocating movement of the first named carriage to shorten and increase the distance between the path of the reciprocating carriage and the other carriage, an electric depth feed motor, depth feed mechanism between said depth feed motor and the second named carriage, forward and reverse driving switches in the circuit between the depth feed motor and a source of electric current, and interlocking switches connected to control the forward and reverse switches of both motors to start and stop them alternately in the operating cycle of the machine.

8. A gear finishing machine according to claim 7, in which the control switches are organized to close the open switch of each motor when the previously closed switch is opened to stop the motor, whereby reverse power is applied to bring the motor rapidly to a standstill.

9. In a gear generating machine, a supporting structure, a carriage reciprocable on said structure, a cutter spindle rotatably mounted on said carriage, a cutter secured to said spindle, a work holder arranged to hold a work gear in position to be entered by the teeth of said cutter in the course of a traverse of the carriage past the work holder, a screw connected to the carriage and restrained thereby against rotation, a nut meshing with said screw and connected to the base to prevent axial movement relatively thereto, a motor, driving mechanism from said motor to said nut constructed to rotate the nut and thereby propel the carriage, means for simultaneously rotating the cutter spindle and work holder including driving trains of which one is longer than the other, a lever mounted on the carriage having two arms, and a stop mounted on the supporting structure located to be engaged by one of said arms when the carriage has reached the end of its advancing travel, whereby the lever is deflected, the second arm of the lever being coupled with the screw to impart an angular movement to the screw when so deflected, whereby to compensate for rotational lag of that element which is driven by the longer train of mechanism.

10. A machine as set forth in claim 9, combined with means for meshing a work piece with the cutter in centralized position when the cutter is angularly displaced, whereby the cutter teeth are brought into even bearing on both sides in the subsequent finish cutting action on the work piece.

References Cited in the file of this patent
UNITED STATES PATENTS

| Number | Name | Date |
| --- | --- | --- |
| 1,035,511 | Zimmermann | Aug. 13, 1912 |
| 1,412,974 | Selvig et al. | Apr. 18, 1922 |
| 1,460,552 | Maag | July 3, 1923 |
| 1,472,848 | Maag | Nov. 6, 1923 |
| 1,549,921 | Oberschmidt | Aug. 18, 1925 |
| 1,724,169 | Barnes | Aug. 13, 1929 |
| 1,807,665 | Miller | June 2, 1931 |
| 1,830,753 | Fickett et al. | Nov. 10, 1931 |
| 1,901,063 | Shaw | Mar. 14, 1933 |
| 2,131,607 | Wade | Sept. 27, 1938 |
| 2,294,447 | Carlsen | Sept. 1, 1942 |
| 2,397,515 | Staub | Apr. 2, 1946 |
| 2,463,165 | Felin et al. | Mar. 1, 1949 |
| 2,499,167 | Sanborn | Feb. 28, 1950 |